No. 616,122. Patented Dec. 20, 1898.
J. S. LESTER.
DRIVING GEAR FOR VEHICLES.
(Application filed Dec. 23, 1897.)
(No Model.)
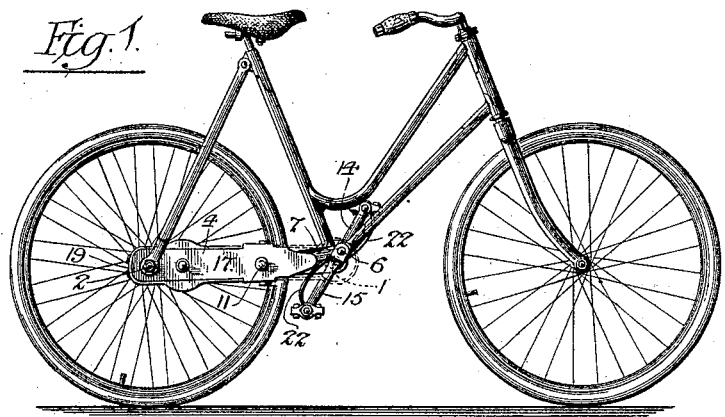
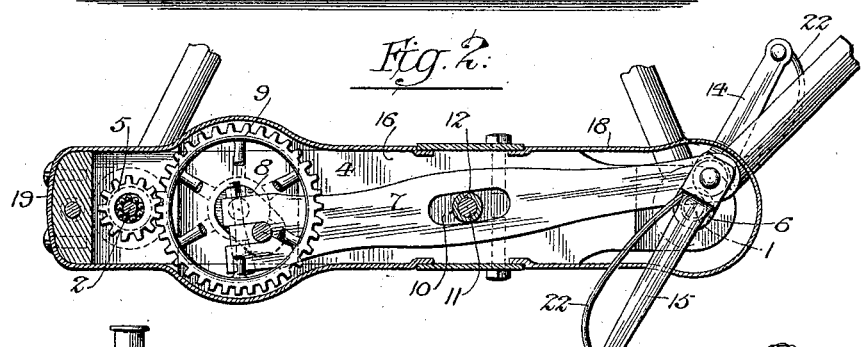
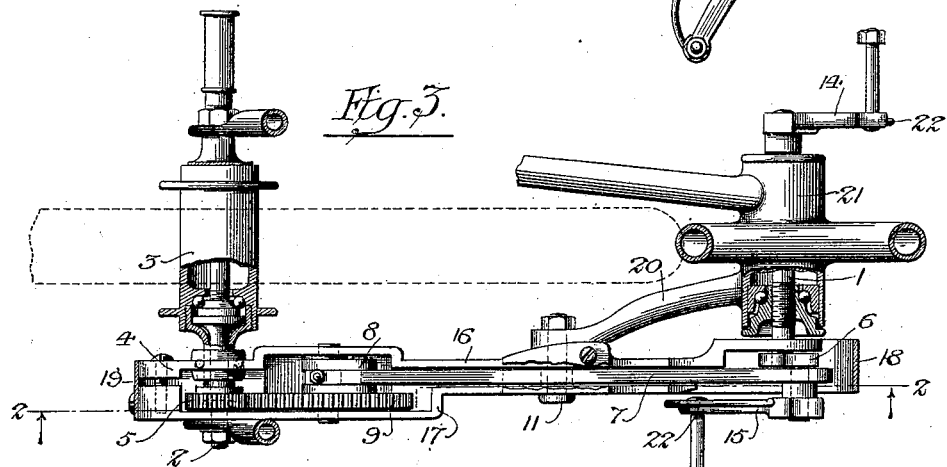
James S. Lester
Inventor:-
Witnesses:-
By his Attorneys,

UNITED STATES PATENT OFFICE.

JAMES S. LESTER, OF ATLANTA, GEORGIA, ASSIGNOR OF ONE-FOURTH TO HENRY C. BEERMANN, OF SAME PLACE.

DRIVING-GEAR FOR VEHICLES.

SPECIFICATION forming part of Letters Patent No. 616,122, dated December 20, 1898.

Application filed December 23, 1897. Serial No. 663,207. (No model.)

*To all whom it may concern:*

Be it known that I, JAMES S. LESTER, a citizen of the United States, residing at Atlanta, in the county of Fulton and State of Georgia, have invented a new and useful Driving-Gear for Vehicles, of which the following is a specification.

My invention relates to driving mechanism for vehicles particularly adapted for use in connection with bicycles, tricycles, and vehicles of analogous classes; and the object in view is to provide a chainless gearing for communicating motion from a driving to a driven shaft with the minimum loss of power by friction and an economical application of power to the driving-shaft.

Further objects and advantages of this invention will appear in the following description, and the novel features thereof will be particularly pointed out in the appended claims.

In the drawings, Figure 1 is a view of a vehicle provided with gearing constructed in accordance with my invention. Fig. 2 is a detail side view of the gearing, the casing being shown in section. Fig. 3 is a plan view, with the casing in section, of the improved gearing and the contiguous portions of the vehicle.

Similar numerals of reference indicate corresponding parts in all the figures of the drawings.

In the construction illustrated the gearing embodying my invention is applied in the operative position to a vehicle of the bicycle type, wherein 1 represents a driving-shaft ordinarily known as the "crank-shaft," and 2 the driving-wheel shaft. In devices of this class it is usual to fix the driving-wheel shaft in a suitable frame and mount the hub of the driving-wheel thereon for independent rotation, and in applying the improved driving mechanism embodying my invention I have followed said ordinary construction, the hub 3 of the driving-wheel being extended into a suitable casing 4, in which the driving mechanism is housed and being fitted with a driving-pinion 5. Any suitable antifriction-bearings may be employed in connection with the mounting of the hub of the driving-wheel.

The driving-shaft is provided with a driving-crank 6, connected by an oscillatory connecting rod or lever 7 with a corresponding driven crank 8, mounted within said casing 4 and carrying a driving-gear 9, which meshes with said pinion 5. The connecting rod or lever has a moving or sliding fulcrum, which in the construction illustrated is formed by means of a longitudinal slot 10 in the rod or lever, mounted upon a fulcrum-pin 11, which is fixed in the casing and may be provided with any suitable antifriction-bearing devices, such as a sleeve 12. It will be seen that the rear or driving crank turns in a reverse direction to the front or driving crank due to the fulcruming of the connecting rod or lever at an intermediate point, and hence to the oscillatory movement of the connecting medium. The effect of this oscillatory movement of the connecting medium in the transmission of motion from a driving to a driven crank is to avoid a dead-center, in that the motion of the connecting medium is not only oscillatory but reciprocatory, and hence when the driving and driven cranks are in alined positions the oscillatory function of the connecting medium is utilized to convey motion to the driven crank, whereas when the cranks are in parallel positions the reciprocatory function of the connecting medium is utilized. Of the crank-arms 14 and 15, which (when the device is used in connection with a bicycle or similar vehicle) are the means whereby foot-pressure is applied, the former is attached directly to the extremity of the crank-shaft 1, while the latter is attached to the journal or spindle portion of the driving-crank, as shown clearly in Fig. 3. This provides for the disengagement of the connecting medium from the driving-crank after the removal of the crank-arm 15.

The casing in which the driving mechanism is housed consists of side plates 16 and 17, fitted with suitable front and rear caps 18 and 19, properly secured to the side plates to exclude dust. Furthermore, a brace 20 preferably projects rearwardly and laterally from the crank-hanger 21 and is terminally connected to the casing at an intermediate point by the bolt which constitutes the above-described fulcrum-pin 11.

In addition to the above-described construction I may provide the crank-arms 14 and 15 with forwardly-bowed guards 22 to throw the trousers-leg or skirt of the rider outwardly from the extremity of the crank-arm or deflect it sufficiently to prevent the catching of the garment upon the end of the crank-arm, whereby the auxiliary trousers-clamps and similar devices now in common use are rendered unnecessary. These guards, however, form no part of my present invention, and hence no claim therefor is made herein. Furthermore, it will be understood, in connection with the driving mechanism above described, that any desired multiplication of speed may be attained by varying the relative sizes of the driving and driven gears and also the thrust of the driving and driven cranks may be varied to give the necessary power proportionately to the throw of the crank-arms or of the pedals carried by the crank-arms.

Various changes in the form, proportion, and the minor details of construction may be resorted to without departing from the spirit or sacrificing any of the advantages of this invention.

Having described my invention, what I claim is—

1. In a bicycle, the combination with a frame having a crank-hanger and a driving-wheel axle, of a casing or housing connecting said crank-hanger and axle at one side of the machine, a side brace extending rearwardly from the crank-hanger and attached to the casing at an intermediate point, a pinion fixed to the driving-wheel axle within the casing, a driving-crank shaft mounted in the crank-hanger, a gear meshing with said pinion and having a driven crank, and an oscillatory lever, arranged within the casing, having a sliding fulcrum, and terminally mounted upon the driving-crank shaft and said driven crank, substantially as specified.

2. In a bicycle, the combination with a frame having a crank-hanger and a driving-wheel axle, of a crank-shaft mounted in the crank-hanger and having a driving-crank, a casing inclosing said driving-crank and connecting the crank-hanger and the driving-wheel axle, a side brace extending rearwardly from the crank-hanger to an intermediate point of said casing, a transverse bearing-pin connecting the end of said brace with the casing, a pinion fixed to the driving-wheel axle within the casing, a driven gear meshing with said pinion and having a driven crank, and an intermediately-slotted connecting rod or lever fulcrumed upon said bearing-pin and terminally mounted upon said driving and driven cranks, substantially as specified.

3. In a bicycle, the combination with a frame having a crank-hanger and a driving-wheel axle, of a crank-shaft mounted in the crank-hanger and having a driving-crank, a casing inclosing said driving-crank and connecting the crank-hanger and the driving-wheel axle, a side brace extending rearwardly from the crank-hanger to an intermediate point of said casing, a transverse bearing-pin connecting the end of said brace with the casing, a pinion fixed to the driving-wheel axle within the casing, a driven gear meshing with said pinion and having a driven crank, and an intermediately-slotted connecting rod or lever fulcrumed upon said bearing-pin and terminally mounted upon said driving and driven cranks, said casing consisting of side plates 16 and 17, and terminal removable caps 18 and 19 provided with securing devices, substantially as specified.

In testimony that I claim the foregoing as my own I have hereto affixed my signature in the presence of two witnesses.

JAMES S. LESTER.

Witnesses:
JOHN H. SIGGERS,
HAROLD H. SIMMS.